United States Patent
Jachuck et al.

(10) Patent No.: US 7,074,353 B2
(45) Date of Patent: Jul. 11, 2006

(54) METHODS OF MANUFACTURING PARTICLES

(75) Inventors: Roshan Jeet Jee Jachuck, Newcastle Upon Tyne (GB); Stuart Cook, North Yorkshire (GB)

(73) Assignee: Protensive Limited, Cambridge (GB)

( * ) Notice: Subject to any disclaimer, the term of this patent is extended or adjusted under 35 U.S.C. 154(b) by 353 days.

(21) Appl. No.: 10/484,609

(22) PCT Filed: Jul. 22, 2002

(86) PCT No.: PCT/GB02/03368

§ 371 (c)(1), (2), (4) Date: Jan. 20, 2004

(87) PCT Pub. No.: WO03/008083

PCT Pub. Date: Jan. 30, 2003

(65) Prior Publication Data

US 2004/0241430 A1 Dec. 2, 2004

(51) Int. Cl.
*B29B 9/00* (2006.01)

(52) U.S. Cl. .................. 264/7; 264/8; 264/9; 264/10; 977/DIG. 1

(58) Field of Classification Search ............. 264/8
See application file for complete search history.

(56) References Cited

U.S. PATENT DOCUMENTS 4,485,055 A 11/1984 Bung et al.

6,210,498 B1 4/2001 Ovshinsky et al.

FOREIGN PATENT DOCUMENTS

| JP | 1156408 | 12/1987 |
|---|---|---|
| WO | WO 99/55454 | 11/1999 |
| WO | WO 00/48728 | 8/2000 |
| WO | WO 00/48729 | 8/2000 |
| WO | WO 00/48730 | 8/2000 |
| WO | WO 00/48731 | 8/2000 |
| WO | WO 00/48732 | 8/2000 |
| WO | WO 00/69014 | 11/2000 |
| WO | WO 01/60511 | 8/2001 |
| WO | WO 01/68297 | 9/2001 |

OTHER PUBLICATIONS

Kamelia Boodhoo, "Process Intensification—Spinning Disc Reactors" Abstracts of Talks at Symposium for Young Scientists, Green Chemistry Network (Sep. 28, 1999).

*Primary Examiner*—Mary Lynn Theisen
(74) *Attorney, Agent, or Firm*—Garvey, Smith, Nehrbass & North, L.L.C.; Seth M. Nehrbass; Brett A. North

(57) ABSTRACT

A method of manufacturing particles, especially nanoparticles, by way of precipitation from solution on a rotating surface (1) of a rotating surface reactor is disclosed. Nanoparticles with a tight size distribution may be manufactured in bulk and without the problems of agglomeration that are associated with traditional stirred-tank reactors. Use of a rotating surface reactor allows precipitation of nanoparticles from viscous, supersaturated solutions by way of homogeneous nucleation aided by strong micromixing.

27 Claims, 7 Drawing Sheets

METHODS OF MANUFACTURING PARTICLES

The present invention relates to the production of particles, in particular but not exclusively nanoparticles, on a rotating surface reactor. Embodiments of the present invention also relate to the production of coated particles of any size, and also to the manufacture of particles having a predetermined shape and size distribution.

There is a growing demand for particles with controlled size, shape and size distribution. More recently the use of nanoparticles or sub-micron size particles. (with a maximum dimension of less than 1 μm, where 1 nm is a billionth of a metre) has found great importance in the production of fine chemicals, catalysts, pharmaceuticals and in electronic applications due to their superior properties. Precipitation from solution represents an inexpensive and simple method for producing nanoparticles. Furthermore, precipitation from solution can be tailored to adjust the particle size distribution at the first step of the crystallisation process, i.e. the primary nucleation. Consequently, precipitation can reduce the cost of production of nanoparticles, and can enhance the quality of the product, in terms of average particle size, particle size distribution, and purity of the product.

Precipitation is commonly defined as the crystallisation of sparingly soluble substances, which are formed by a chemical reaction. Precipitation phenomena involve the simultaneous and rapid occurrence of different processes. In particular, it is possible to identify a number of primary processes, such as the mixing of the reactants on macro-, meso- and micro-scale, the chemical reaction, and the nucleation and growth of the particles. In general, the two latter processes happen concurrently to secondary phenomena, such as particle aggregation, ageing and ripening. It is therefore possible to identify primary particles, which are formed by crystal nucleation and growth, and secondary particles, which derive mainly from aggregation phenomena.

Supersaturation is known to play the main role in controlling the mechanism and the kinetic of nucleation and growth processes. In particular, heterogeneous nucleation can take place at any level of supersaturation within the metastable limits, whilst very high levels of supersaturation are required for homogenous nucleation, which takes place only in the labile region of the phase concentration-temperature. Depending on the level of supersaturation, nucleation phenomena are generally very fast in precipitation processes (with induction times less than 1 ms). Consequently, the intensity of mixing plays a fundamental role in determining local supersaturation and the precipitation mechanism and, hence, particle properties and crystal size distribution. If the mixing conditions are intense enough, homogeneous nucleation becomes dominant with respect to heterogeneous nucleation. In general, when the desired average crystal size is in microns with tight crystal size distribution then homogeneous nucleation is preferred to heterogeneous nucleation.

Very high levels of supersaturation and intense mixing are required to ensure that homogeneous nucleation is the dominant nucleation mechanism. A very effective mixing of the two reagents at molecular level is defined as micromixing. Micromixing conditions are achieved when the mixing time, $t_m$, is shorter than the induction time, $t_{ind}$, which is also known as the characteristic reaction or nucleation time. It is noted that nucleation is a very fast process and the time that elapses between the reaction and the nucleation is negligible, thus reaction and nucleation can be considered almost contemporary processes.

However, high supersaturation implies high nucleation rate, hence a large number of particles per unit volume, with a large surface to volume ratio. This can lead to a high collision rate between the particles, and hence to fast agglomeration phenomena. With respect to this issue, Heyer et al. (Heyer, C., and Mersmann, A., 1999. The Influence of Operating Conditions on the Precipitation of Nanoparticles. *Industrial Christallization*. IchemE.) observed that when dealing with nanoparticles, nucleation and agglomeration are the main mechanisms to be considered, whilst crystal growth does not play an important role.

Stirred tank reactors are commonly used as industrial precipitators. However, they cannot provide the required uniform level of supersaturation and intensity of mixing. On the other hand, continuous flow mixers, such as T-mixers and Y-mixers, are known to be much more efficient than mechanical stirrers for mixing purposes, and to provide the operating conditions that are required for homogeneous nucleation. However, such devices are characterised by a high level of energy consumption, which makes the scale-up to industrial scale inconvenient from an economical point of view.

According to a first aspect of the present invention, there is provided a method of manufacturing nanoparticles comprising the steps of:
i) supplying a solution of at least one predetermined substance to a rotating surface of a rotating surface reactor,
ii) operating the rotating surface reactor so that the rotating surface spins at a speed sufficient to cause the solution to spread over the rotating surface as a continuously flowing thin film;
iii) controlling the rotating surface reactor so as to cause micromixing, homogeneous nucleation and precipitation or crystallisation of nanoparticles within the thin film;
iv) collecting precipitated or crystallised nanoparticles from a periphery of the rotating surface.

Advantageously, heat may be applied to the solution on the rotating surface so as to cause evaporation and eventual supersaturation of the solution or reduction in solubility while it is on the rotating surface. This may be achieved by heating the surface, possibly from a side thereof remote from where the solution is located. Alternatively, the rotating surface may be cooled so as to reduce solubility and thus to achieve high supersaturation. Other methods of causing supersaturation of the solution on the rotating surface may also be employed.

According to a second aspect of the present invention, there is provided a method of manufacturing nanoparticles comprising the steps of:
i) supplying a supersaturated solution of at least one predetermined substance to a rotating surface of a rotating surface reactor;
ii) operating the rotating surface reactor so that the rotating surface spins at a speed sufficient to cause the supersaturated solution to spread over the rotating surface as a continuously flowing thin film;
iii) controlling the rotating surface reactor so as to cause micromixing, homogeneous nucleation and precipitation or crystallisation of nanoparticles within the thin film;
iv) collecting precipitated or crystallised nanoparticles from a periphery of the rotating surface.

Rotating surface reactors suitable for use in the method of the present invention are disclosed in PCT/GB00/00519, PCT/GB00/00521, PCT/GB00/523, PCT/GB00/524; PCT/

GB00/00526 and PCT/GB01/00634, the full disclosures of which are hereby incorporated into the present application by reference. Rotating surface reactors may be in the form of spinning disc reactors, spinning cone reactors and other shaped reactors as discussed in the above patent applications.

In embodiments of the present invention, homogeneous nucleation may be achieved even when supersaturation is in excess of 2000.

Additional gaseous reactants may also be supplied to the rotating surface in embodiments where the rotating surface is contained within a housing.

Nanoparticles produced by way of the present invention may have a mean maximum dimension of less than 1 µm, preferably less than 0.9 µm, and even more preferably less than 0.8 µm. In some embodiments, mean maximum particle dimensions of 0.5 µm and below may be achieved. An advantageous feature of the present invention is the ability to generate nanoparticles with a tightly controlled size distribution. In a particularly preferred embodiment, nanoparticles with a mean maximum dimension of 5 nm to 0.99 µm may be produced.

Rotating surface reactors use centrifugal acceleration to produce very thin films on a rotating surface. This has several advantages, including the ability to produce extremely thin films even for reasonably large flowrates, with very short residence times. Furthermore, these reactors require lower pumping energy than other continuous flow mixing devices. This is because, in rotating surface reactors, the liquid film does not experience any pressure drop on the rotating surface, and the centrifugal acceleration is enough to ensure a continuous flow of the thin liquid film. Consequently, rotating surface reactors can be operated in continuous mode with less energy consumption than tubular mixers. The high performance that characterises rotating surface reactors is mainly due to the high shear forces and instability that can be generated within the thin liquid films as they drain over the rotating surface. These forces give rise to waves and ripples, which enhance the intensity of mixing and the heat/mass transfer rates produced in such reactors. In addition such reactors provide higher surface area to volume ratio than the T-mixers and Y-mixers, which we have found to reduce the frequency of collisions between precipitated particles, and hence to influence agglomeration phenomena.

In particular, the present applicant has found that in conventional batch or continuous mixers, the generation of large numbers of nanoparticles or other precipitate from a solution tends to cause a significant increase in the viscosity of the solution as a whole, which then tends to suppress mixing. Suppression of mixing tends to cause excessive particle growth and agglomeration of particles, which is highly undesirable when trying to produce nanoparticles. Highly supersaturated solutions also tend to be relatively viscous, which also tends to suppress mixing, leading to the problems outlined above.

The present applicant has found that rotating surface reactors offer a high degree of mixing of highly supersaturated solutions leading to homogeneous nucleation, which are ideal conditions for the bulk production of nanoparticles. Furthermore, rotating surface reactors can be made to any practical size or scale without undue difficulties, thus opening up the possibility of industrial scale production of nanoparticles. This is not possible in conventional batch or continuous reactors, which need to be at a small scale in order to avoid the generation of particles of greater than nanometric size or the agglomeration of precipitated nanoparticles.

A further property of rotating surface reactors is that centrifugal forces acting on a thin film on the rotating surface tend to draw out the film across the surface in a generally radial outward direction ("divergent flow"). This "film-drawing" property significantly reduces agglomeration of precipitated nanoparticles by reducing mutual collisions therebetween. It is thought by the present applicant that, in connection with a spinning disc reactor, supply of a highly supersaturated solution to a central portion of the spinning disc results under appropriate conditions results in homogeneous nucleation in a generally annular or circular region relatively close to the centre of the disc due to the high degree of micromixing. The film-drawing effect tends to draw the seed crystals formed by the nucleation process across the surface of the disc, along a decreasing saturation gradient, to the periphery of the disc. Because the seed crystals quickly move to peripheral areas of lower saturation, particle growth is slowed and agglomeration is reduced by virtue of the relatively increased spatial separation of the particles. This process may be enhanced by supplying an appropriate miscible diluent to a region of the disc surface outside the precipitation or nucleation zone near the centre of the disc, thus helping further to reduce agglomeration. It will be appreciated that this applies generally to any rotating surface reactor, not just spinning disc reactors, and that for any rotating surface reactor, the locations of the precipitation or nucleation zone and the surrounding region to which the miscible diluent is added will be apparent to those skilled in the art.

Full details of rotating surface reactors adapted to allow the addition of further substances to non-central regions of the rotating surface are disclosed in PCT/GB00/00521 and PCT/GB01/00634, the full contents of which are incorporated into the present application by reference.

The present applicant has also found that rotating surface reactors are particularly suited for reacting mixtures or solutions of relatively high viscosity for reasons other than the high degree of micromixing that is achievable. It is sometimes advantageous to provide a non-stick (e.g. PTFE) coating to the rotating surface so as to reduce fouling. However, due to the non-stick nature of such coatings, they do not tend to have a high degree of wettability. This is because internal surface tension effects overcome the adhesion of the mixture or solution to the non-stick coating and thus lead to film breakdown when operating the rotating surface reactor. When film breakdown occurs, the micromixing effect is lost, and control over nanoparticle formation is significantly reduced. However, by using highly viscous supersaturated solutions, film breakdown on non-stick coated rotating surfaces can be much reduced, thereby leading to greater control over nanoparticle formation.

Where the rotating surface reactor is provided with peripheral collection surfaces onto which product is thrown from the periphery of the rotating surface (see, for example, PCT/GB00/00521 and PCT/GB01/00634), it is preferred that these collection surfaces are coated with or otherwise provided with a non-stick surface such as PTFE so as to reduce fouling. Additional features that may help to prevent fouling are curved collection surfaces and/or collection surfaces provided with a liquid flushing mechanism.

Various precipitation mechanisms (organic and inorganic) may be performed on a rotating surface reactor in accordance with the present invention.

One useful precipitation mechanism is based on the reactive chemistry of inorganics, details of which will be known to those of ordinary skill in the art. This mechanism is appropriate for manufacturing inorganic nanoparticles, such as crystals of barium sulphate, calcium carbonate and titanium dioxide, among others.

A second precipitation mechanism which is particularly suited for the manufacture of organic nanoparticles is known as "drown-out". In this mechanism, at least one organic compound is dissolved in an appropriate miscible organic solvent (e.g. acetone or the like). In order to initiate precipitation, water is then added to the solution, and the at least one organic compound then precipitates out as a result of its reduced solubility in aqueous or part-aqueous systems.

A third precipitation mechanism is metal precipitation, for example hydrogen reduction of metal salts to precipitate metallic nanoparticles. When conducting hydrogen reduction, it is necessary to supply gaseous hydrogen to a solution of metal salts on the rotating surface of a rotating surface reactor. It is therefore preferred that a rotating surface reactor with a gas-tight shroud or cover mounted over the rotating surface is used for this mechanism.

A fourth precipitation mechanism relies on cooling to cause precipitation of nanoparticles. This is especially useful for systems in which the solubility of the solute in the solvent decreases with temperature. It is envisaged that such a mechanism may also be of use in the large-scale manufacture of ice cream, since freezing liquid ice cream mixture on a rotating surface reactor by removing heat therefrom may result in the formation of ice crystals having a mean maximum dimension of less than 1 µm. This results in ice cream having an excellent texture and mouth-feel due to the small size of the ice crystals.

A fifth precipitation mechanism relies on evaporation to cause precipitation of nanoparticles. Where a supersaturated solution is heated so as to cause evaporation of solvent, this will cause precipitation of the solute in appropriate systems. An example of this mechanism is the precipitation of organic and/or inorganic solute from aqueous acetone.

Rotating surface reactors are well suited to the fourth and fifth precipitation mechanisms outlined above, since they provide excellent heat transfer characteristics due to the thinness of the thin film on the rotating surface and the high degree of mixing. Rotating surface reactors which are particularly suited to these mechanisms may have rotating surfaces made of materials with excellent thermal conductivity, such as metals, and be provided with heat transfer mechanisms such as the supply of a heat transfer fluid (cooling or heating) to an obverse surface of the rotating surface remote to the surface where the thin film is formed. Alternatively, the rotating surface may be provided with electric heating elements, or may be heated by induction heating by rotating a metallic surface in a magnetic or electromagnetic field. Examples of rotating surface reactors having effective heating and cooling (heat transfer) mechanisms are set out in PCT/GB00/00526, the full disclosure of which is hereby incorporated into the present application by reference.

A sixth precipitation mechanism is the co-precipitation of two or more systems, for example a calcium carbonate precipitation mechanism of the first type mentioned above, combined with the simultaneous drown-out in situ of an organic component according to the second precipitation mechanism discussed above. This may result in nanoparticles of an inorganic substance coated with the organic component or vice versa. Clearly, two or more of the five preferred precipitation mechanisms may be combined where appropriate. One example of a useful co-precipitation mechanism is the co-precipitation of an pigment (usually organic, but sometimes inorganic) with an organic polymer so as to produce photocopier/laser printer toner An additional feature of embodiments of the present invention is the application of ultrasonic or other additional vibrational energy to the thin film on the rotating surface or to product thrown from a periphery of the rotating surface during or after collection so as to reduce agglomeration of precipitated nanoparticles. Alternatively or in addition, electromagnetic radiation (for example UV, IR, X-ray, gamma ray, light, magnetic and electric fields and so forth) may be applied to the thin film on the rotating surface or to product thrown from a periphery of the rotating surface during or after collection so as to reduce agglomeration of precipitated nanoparticles. A rotating surface reactor adapted to apply additional ultrasonic or vibrational energy is disclosed in PCT/GB00/00524, the full contents of which is hereby incorporated into the present application by reference.

In summary, embodiments of the present invention provide for the large-scale production on nanoparticles on a rotating surface reactor. Through appropriate control of the reactor (e.g. control of speed of rotation, selection of the shape, configuration and material of the rotating surface, application of predetermined temperature and pressure conditions, application of additional vibrational or electromagnetic energy) and through careful selection of the precipitation mechanism, it is possible to control the form or shape, the size and the size distribution of precipitated nanoparticles so as to suit different applications. In order to achieve a desired product quality, it is preferred that the rotating surface reactor is controlled so as to generate a peripheral thin film thickness thereon of at most 600 µm, with corresponding speeds of rotation being calculated from:

$$\delta = \left(\frac{3}{2\pi} \frac{vQ}{\omega^2 r^2}\right)^{1/3} \quad (0)$$

where:
 δ=film thickness
 Q=volumetric flow rate
 ω=angular velocity
 r=radial position
 v=kinematic viscosity Preferred speeds of rotation may be up to 1000 rpm, up to 2000 rpm, up to 5000 rpm, up to 10000 rpm, 10000 rpm and over, 1000 rpm to 5000 rpm, 1000 rpm to 10000 rpm, 5000 rpm to 10000 rpm or any speed appropriate to a particular size of surface.

Although the present invention has been described above in relation to a method of producing nanoparticles, it is not limited thereto, and larger particles may be produced under appropriate conditions.

Further examples of particles or nanoparticles that may be produced by way of embodiments of the present invention include:

i) Particles or nanoparticles for use in cosmetics, such as titanium dioxide and other inorganic or organic particles for use as, for example, sun-screens, sun-blocks and reflectors.

ii) Particles or nanoparticles for use in electronics applications. For example, particles or nanoparticles having a narrow size distribution may be used for grinding purposes or as fillers in adhesives which allow microscopic components in electronics assemblies to be accurately spaced.

iii) Particles or nanoparticles for use in ink jet applications, which may be coated and/or have a narrow size distribution and/or predetermined shape or morphology. These particles or nanoparticles may be mixed into fluids for use as ink in ink jet printers and the like, this mixing advantageously being carried out also on a rotating surface reactor.

According to a third aspect of the present invention, there is provided a method of producing particles of predetermined shape or morphology by way of precipitation or crystallisation from solution on a rotating surface of a rotating surface reactor, comprising the steps of:
i) supplying a solution of at least one predetermined substance to a rotating surface of a rotating surface reactor;
ii) operating the rotating surface reactor so that the rotating surface spins at a speed sufficient to cause the solution to spread over the rotating surface as a continuously flowing thin film;
iii) controlling the rotating surface reactor so as to cause micromixing, homogeneous nucleation and precipitation or crystallisation of particles within the thin film;
iv) collecting precipitated or crystallised particles from a periphery of the rotating surface;
wherein operating conditions of the rotating surface reactor at step iii) above are selected from one of at least first and second sets of operating conditions, the first set of operating conditions giving rise to particles having a first, predetermined shape or morphology and the second set of operating conditions giving rise to particles having a second, predetermined shape or morphology different from the first.

In this way, embodiments of the present invention provide a method of controlling the shape or morphology of particles precipitated or crystallised out of solution, whether nanoparticles or larger, in an industrially reliable and efficient manner.

According to a fourth aspect of the present invention, there is provided a method of manufacturing hollow particles by way of precipitation or crystallisation from solution on a rotating surface of a rotating surface reactor, comprising the steps of:
i) supplying a solution of at least one predetermined substance to a rotating surface of a rotating surface reactor;
ii) operating the rotating surface reactor so that the rotating surface spins at a speed sufficient to cause the solution to spread over the rotating surface as a continuously flowing thin film;
iii) controlling the rotating surface reactor so as to cause micromixing, homogeneous nucleation and precipitation or crystallisation of hollow particles within the thin film;
iv) collecting the hollow particles from a periphery of the rotating surface.

Preferably, the rotating surface is heated so as to cause at least partial evaporation of the solution, thereby directly producing hollow particles without the need for subsequent drying.

For the avoidance of doubt, it is hereby stated that the description above in relation to the first and second aspects of the present invention apply also in relation to the third and fourth aspects of the invention, albeit that the third and fourth aspects of the invention are not limited to the production of nanoparticles. Nevertheless, the third and fourth aspects of the invention may be used for the production of nanoparticles.

Preferably, the solution on the rotating surface is a supersaturated solution or becomes supersaturated under appropriate operating conditions.

In all of the aforementioned aspects of the present invention, it is to be appreciated that particle size will to some extent be limited by a thickness of the film on the rotating surface of the reactor. Specifically, the precipitation and coating mechanisms mean that the particles cannot generally grow to a size that is greater than the thickness of the film. Accordingly, a good way of controlling maximum particle size is to control the thickness of the film on the rotating surface. The present applicant has found that it is possible to control the rotation of the surface and a feed rate of solution to the surface in such a way as to achieve an average film thickness of 50 to 300 µm, with an average thickness of 100 µm being appropriate in some circumstances. Average thicknesses as high as 1000 µm may be expected at particularly high feed rates, and average thicknesses as low as 10 µm or even lower, such as 5 µm or less, may be achieved. Such film thicknesses are associated with high mixing intensities, shear rates and plug flow characteristics. It will be appreciated that, in general, the film thickness will be greatest on the surface at a point where solution supplied thereto. For example, in a typical process where reactants are supplied generally to a centre of the surface, the film thickness will be greatest at the centre and will taper towards a periphery of the surface due to centrifugal effects. Typically, for an average film thickness of 100 µm, the thickness at the centre of the surface may be around 300 µm.

In all of the various aspects of the invention as set out hereinbefore, one or more additives may be supplied to the rotating surface so as to coat the seed crystals or precipitate. In general, any appropriate fluid or solid coating additive may be used to coat any appropriate solid or fluid precipitate. The coating additive may be supplied to the rotating surface together with the at least one predetermined substance, or may be added to a region of the rotating surface peripheral to the location to which the predetermined substance is supplied. Suitable coating additives include surfactants, detergents and polymers in solid or fluid form. By choosing the coating additive appropriately and selecting appropriate rotation speeds and locations of additive addition, the thickness of the coating on the precipitate can be controlled as desired.

The coatings described above can help to reduce agglomeration of the precipitated nanoparticles or particles of greater size and may also be useful in themselves for producing finished nanoparticles or particles with a coating. For example, there is great interest in nanoparticles for use in the pharmaceutical industry. This is because many pharmacologically-active compounds are not very soluble in aqueous solution, and are therefore not easily absorbed by the human or animal body. This problem can be reduced by preparing the pharmacologically-active compounds as nanoparticles, which have increased dissolution rate due to an improved surface area to volume ratio and which may also be small enough to cross cell membranes and the like without the need to be dissolved in aqueous solution. The pharmacologically-active nanoparticles may thus pass into non-aqueous lipid regions of a cell without the need to be dissolved in aqueous solution, where they may have a therapeutic effect. By providing an appropriate and relatively inert coating, slow-release pharmaceuticals may be prepared, as may pharmaceutical nanoparticles that only become active when they reach a particular region of the body (by choosing a coating that is selectively soluble in that region).

In a particularly preferred embodiment, a coating additive may be supplied to the predetermined substance on the rotating surface together with a diluent. This may be instead of or in addition to the supply of miscible diluent to a region of the rotating surface outside the precipitation or nucleation zone.

The coating or coatings may be applied to any desired thickness and to particles of any size, shape or configuration.

For a better understanding of the present invention and to show how it may be carried into effect, reference shall now be made by way of example to the accompanying drawings, in which.

The precipitation of barium sulphate corresponding to the following reaction was studied:

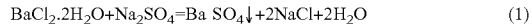

$$BaCl_2 \cdot 2H_2O + Na_2SO_4 = Ba\ SO_4\downarrow + 2NaCl + 2H_2O \qquad (1)$$

Figure 1:
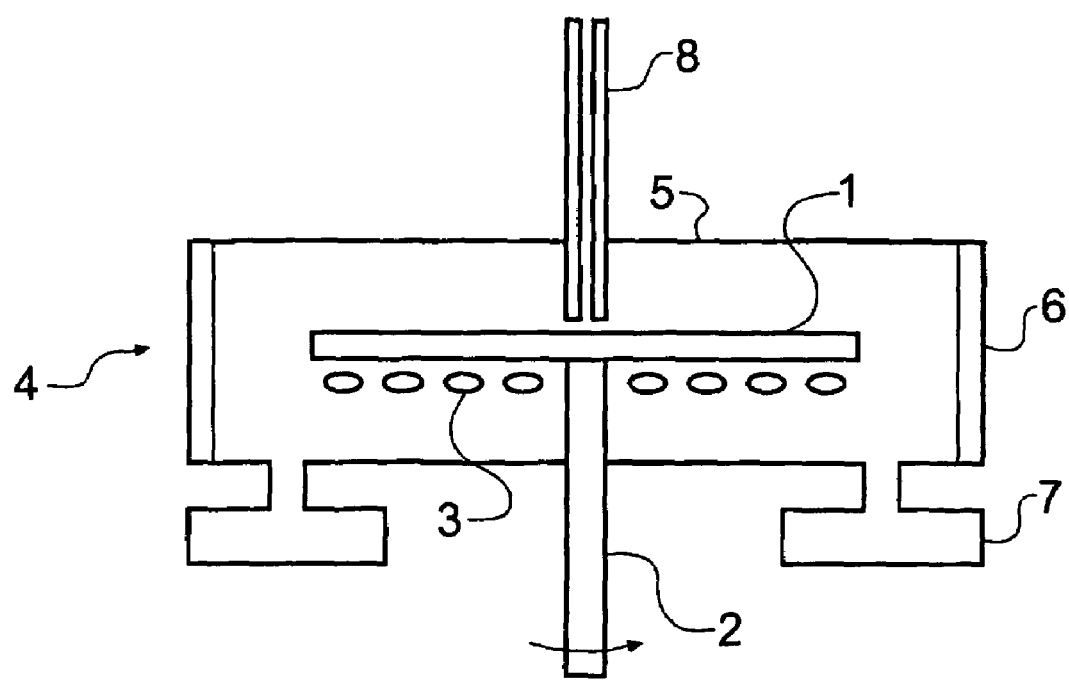
FIG. 1 is a schematic outline of a spinning disc reactor.

Precipitation experiments were carried out on a rotating brass disc of 0.5 meters in diameter. A schematic representation of the system is shown in FIG. 1. The spinning disc reactor comprised a brass disc 1 metal sprayed with aluminium bronze powder to create surface imperfections of the order of 100 microns in order to promote mixing in a liquid film on an upper surface of the disc 1. A variable speed motor (not shown) was used to operate the spinning disc reactor, and the motor drive was connected to the bottom of the disc 1 via a central shaft 2. The speed of the disc 1 was varied by using a control regulator between 100 and 1000 rpm, and was recorded by an analogue tachometer. The accuracy of the tachometer was within 10 rpm. A lower surface of the disc 1 was provided with radiant electric heaters 3, and the disc 1 was mounted inside a casing 4 having a transparent top 5. The casing 4 was provided with water-cooled side walls 6 against which product was thrown from a periphery of the disc 1 and thence into a collection trough 7.

Two aqueous reagent solutions were fed onto the disc 1 surface through a hole in the transparent top 5 by means of two 56 ml burettes 8, which were located at a radial distance of 0.05 meters from the centre of the disc 1. The precipitated slurry was collected in the trough 7 as shown in FIG. 1.

Experiments were performed by mixing equivalent amounts of barium chloride dihydrate and sodium sulphate solutions on the surface of the spinning disc 1. Analytical grade chemicals were dissolved in ordinary distilled water. Experiments were carried out at 25±0.5° C. At this temperature the equilibrium solute concentration is equal to $1.009 \times 10^{-5}$ M. The reactant flowrates were equal to $1.33 \times 10^{-6}$ m$^3$/s and each run lasted 86 seconds.

Through each run, 2 ml of the slurry were sampled at fixed time intervals from the disc casing 4. After withdrawal from the trough 7, the samples were quickly poured into 20 ml of 0.02% wt. gelatine solution. This procedure helped to avoid agglomeration and settling of the precipitated particles. Both the crystal habit and the number of particles were examined by using a transmission electron microscope and a hemacytometer, respectively.

Samples for transmission electron microscopy were prepared by introducing a few drops of the suspension into a carbon coated copper grid (200 mesh). The grid was placed on a filter paper in order to absorb excess solution. It was then dried to recover the crystals.

1 ml of the suspension was used in a hemacytometer for counting the number of precipitated particles. The counting cell was placed under a light microscope, which was connected to a camera, which was used to take three pictures per sample. In each photograph, six squares of the grid were distinctly visible. Thus, eighteen squares per sample were used for counting.

An X-ray diffraction analysis of the solid product was then performed. The suspension was filtered on a blue Whatman filter paper using a vacuum pump and dried in an oven at 100° C. The dried precipitate was then bombarded by Co—K α rays and was confirmed to be anhydrous $BaSO_4$.

The first runs were operated at a potential supersaturation ratio expressed in terms of solute concentration, $S_0$, ranging between 100 and 10000. The first series of three runs was made at a rotating speed of 1000 rpm and initial supersaturation values of 100, 2000 and 2500. The number of crystals per cubic centimeter is given in Table 1, and was found to increase as the initial supersaturation level increased. It is noted that at an initial supersaturation value of 100, the number of precipitated crystals per cubic centimeter when using the spinning disc reactor is $6.9 \times 10^7$. In contrast, Nielsen (Nielsen, A. E., 1961,. Homogeneous Nucleation in Barium Sulphate Precipitation, *Acta Chemica Scandinavica*, 15, 441–442) counted $5.0 \times 10^5$ crystals by using a T-mixer at the same supersaturation level. From these figures, the spinning disc reactor appears to be more effective than the T-mixer used by Nielsen even at not excessively high values of supersaturation. Similarly, the number of crystals generated at $S_0=2000$, i.e. $3.2 \times 10^9$, is significantly more than the number of crystals counted by Mohanty et al. (Mohanty, R. Bhandarkar, S. Zuromski, B., Brown, R., Estrin, J., 1988, Characterising the Product Crystals from a Mixing Tee Process, *AIChE Journal*, 34 (12), 2063–2068) when using a T-mixer, which ranges between $2.2 \times 10^8$ and $4.0 \times 10^8$. Mohanty et al. emphasised that homogeneous nucleation took place in their experiments for an initial supersaturation equal or higher than 2000. Therefore, it was concluded that homogeneous nucleation occurred also in the runs carried out in this work for the same levels of initial supersaturation ($S_0=2000$ and $S_0=2500$).

Figure 2:
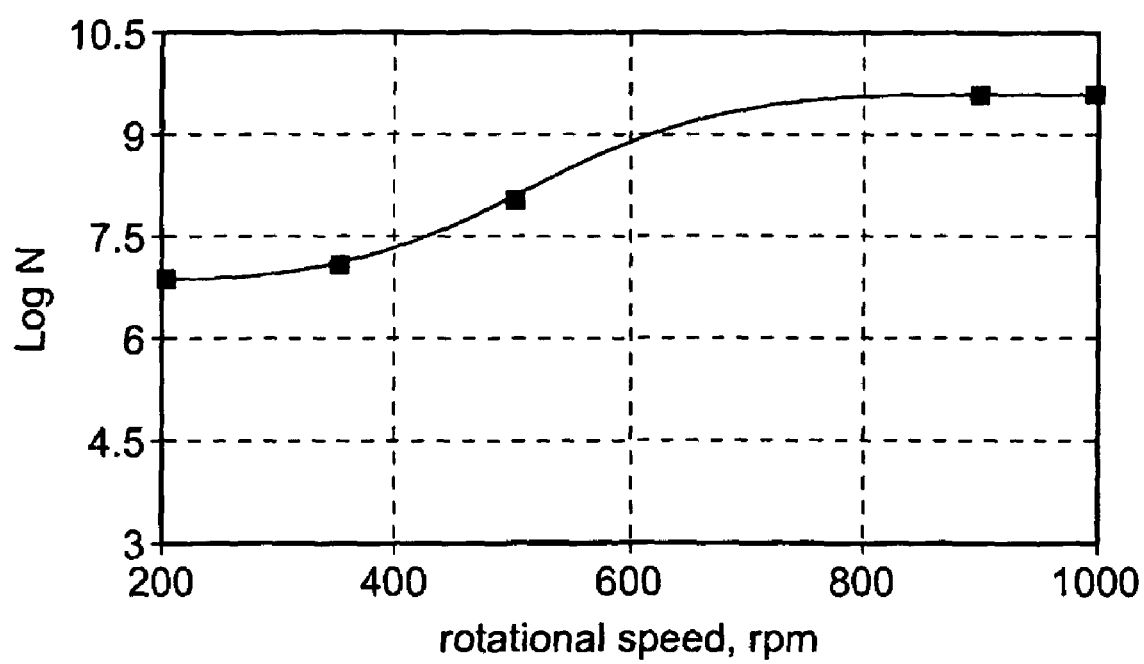
FIG. 2 is a plot of particle number $N/cm^3$ versus rotational speed of the spinning disc reactor at an initial supersaturation $S_0=2000$ for an inorganic precipitation of barium sulphate from a solution of hydrated barium chloride and sodium sulphate on the spinning disc reactor of FIG. 1.

Subsequently, five runs were then made at various rotation speeds in the range 200–1000 rpm, at an initial supersaturation value of 2000. The plot of the number of precipitated crystals against the rotational speed is given in FIG. 2. From this plot it can be observed that the rotational speed of the spinning disc 1 affects the number of precipitated crystals up to 900 rpm, whilst it does not appear to have any effect for rotational speeds above 900 rpm. At the same time, it was also observed that when increasing the rotational speed from 200 rpm up to 1000 rpm, the average crystal dimension decreases from 3.0 to 0.7 µm. Furthermore, at a rotational speed of 1000 rpm the size range of the precipitated crystals was very narrow (0.5 to 1 µm). These results were also interpreted as a reflection of an intense homogeneous nucleation which increases with increasing rotational speeds of the spinning disc.

The operating conditions of interest were those corresponding to an initial supersaturation level of 2000. This was attained by mixing equivalent amounts of barium chloride dihydrate and sodium sulphate solutions (0.04M) on the surface of the spinning disc reactor.

First of all the mass balance for $BaSO_4$ was verified in order to validate the measured number of precipitated crystals. Given that the overall inlet concentration of both ions $Ba^{2+}$ and $SO_4^{2-}$ is 0.02M and the molecular mass of barium sulphate is 0.23339 kg/mole, the inlet mass of barium sulphate per $cm^3$ of solution was approximately $0.46678 \times 10^{-5}$ $kg/cm^3$. This was compared with the outlet mass of barium sulphate, which was calculated on the basis of the number of precipitated particles ($3.2 \times 10^9$ per $cm^3$) and the average size of the particles (0.7 µm). In particular, denoting the volumetric shape factor by $k_v$, the volume of the single particle was approximated as $k_v \cdot 0.343 \times 10^{-18}$ $m^3$. Hence, on the basis of the density of barium sulphate (4500 $kg/m^3$) the mass of the single particle was approximated by $k_v \cdot 1.5435 \times 10^{-15}$ kg. This, multiplied by the number of precipitated particles, gives an overall precipitated mass of barium sulphate per $cm^3$ of solution equal to $k_v \cdot 0.49392 \times 10^{-5}$ $kg/cm^3$, which would be the same as the inlet mass for $k_v$ equal to 0.945. This value of the volumetric shape factor, which appears reasonable for an almost cubic crystal, confirms the consistency of the obtained results with the mass balance.

In order to check whether the operating conditions are such to ensure homogeneous nucleation, the occurrence of micromixing for the spinning disc operated at $S_0=2000$ and rotation speed equal to 900 rpm was examined. As stated before, an effective micromixing occurs when the mixing time, $t_m$, is smaller than the induction time $t_{ind}$. In general the induction time is defined as the time elapsed between the mixing of the solution containing the reagent ions and the formation of nuclei of visible dimensions, i.e. 0.5µ in size (Carosso, P. A. and Pellizzetti, E., 1984, A Stopped-Flow Technique in Fast Precipitation Kinetics—The Case of Barium Sulphate, *Journal of Crystal Growth*, 68, 532–536). Therefore, it is the sum of the initial nucleation time plus the time required for the growth of nuclei up to crystals of detectable size. However, the growth time is considered negligible with respect to the initial nucleation time, which is thus assumed to be equal to the induction time. It is common practice to determine an experimental induction time, which is highly dependent on the equipment used to detect the particles and its sensitivity.

During the experiments carried out on the spinning disc reactor, it was not possible to detect the appearance of the first precipitated particles in the liquid film flowing over the surface of the disc. Therefore, to extrapolate the induction time for the precipitation of barium sulphate on the spinning disc reactor it was decided to use the same expression identified by Carosso et al. (1984):

$$\text{Log}(t_{ind}) = 15.5 \cdot \text{Log}^{-2} S_a - 4.2 \quad (2)$$

where the supersaturation ratio $S_a$ is expressed in terms of the activity coefficients of the $Ba^{2+}$ and $SO_4^{2-}$ ions in solution. To identify this expression, the present applicant used light transmittance as a medium to measure the time of formation of the particles of barium sulphate. Such apparatus could measure induction times ranging between 30 ms and 5 ms. The equipment was similar to a Y-mixer, operated with concentrations of barium sulphate ranging between $8 \times 10^{-4}$ and $8 \times 10^{-3}$ mol/l, and the nucleation was homogeneous. With respect to this issue, it is noticed that the concentration of barium sulphate used for the experiments on the spinning disc reactor ($2 \times 10^{-2}$M) is higher than the concentration used by Carosso et al. (1984). Nevertheless, the approximation due to the use of Equation 2 to extrapolate the induction time for the precipitation of barium sulphate on the spinning disc was considered acceptable because the operating conditions were consistent with those of Carosso et al. (1984), i.e. homogeneous nucleation.

The calculation of the supersaturation level in terms of the activity coefficients was carried out following Söhnel et al. (Söhnel, O., Garside, J., 1992, *Precipitation, Basic Principles and Industrial Applications*. Butterworth-Heinemann Ltd. Oxford), and using, in particular, the Bromley correlation for multicomponent systems (Expressions 2.60 to 2.64, Söhnel et al., (1992)). This gave an activity coefficient γ that is approximately equal to 0.31 for the solution 0.02M of barium sulphate, with a supersaturation expressed in terms of the activity coefficients, $S_a$, equal to 1272. Using Equation 2, the corresponding induction time, $t_{ind}$, is approximately equal to 2.56 ms. The mixing time, $t_m$, of the reactant solutions on the spinning disc was calculated on the basis of the hydrodynamic properties of the aqueous solution and of the specific dispersed power, ϵ. This was estimated following Moore (Moore, S. R., 1996, Mass Transfer to Thin Liquid Films on Rotating Surfaces, with and without Chemical Reaction, *Ph. D. Thesis*, Newcastle upon Tyne):

$$t_m = 2 \cdot \left(\frac{v_L}{\varepsilon}\right) \cdot \arcsin(0.05 \cdot Sc) \quad (3)$$

where $v_L$ denotes the kinematic viscosity of the solvent. Sc is the Schmidt number given by:

$$Sc = \frac{v_L}{D} \quad (4)$$

where D denotes the diffusion coefficient. For the case study examined in this work, the kinematic viscosity, $v_L$, is equal to $1.022 \times 10^{-6}$ ($m^2/s$), the diffusion coefficient, D, is equal to $9.42 \times 10^{-9}$ ($m^2/s$), and the Schmidt number, Sc, is equal to 108.59.

Following Moore (1996), the specific dispersed power, ϵ, in Equation 3, was computed as:

$$\varepsilon = \frac{1}{2 \cdot t_{res}} \cdot \{(r^2 \cdot \omega^2 + u^2)_o - (r^2 \cdot \omega^2 + u^2)_i\} \quad (5)$$

where $t_{res}$ denotes the residence time of the liquid solution on the spinning disc, r the radial distance from the centre of the disc, ω the angular velocity of the disc and u the average velocity of the liquid solution on the disc. In Equation 5, the subscripts "o" and "i" indicate if r, ω and u must be computed on the outer or inner radius of the disc, respectively.

The average velocity, u, of the liquid solution on the disc is given by:

$$u = \left(\frac{\rho_L \cdot Q_L^2 \cdot \omega^2}{12 \cdot \pi^2 \cdot \mu_L \cdot r}\right)^{1/3} \quad (6)$$

where $Q_L$ denotes the flowrate on the disc, $\rho_L$ the density of the solution, and $\mu_L$ the viscosity of the solvent.

The residence time of the solution on the disc was calculated as:

$$t_{res} = \frac{3}{4} \cdot (12 \cdot \pi^2)^{1/3} \cdot \left[\frac{\mu_L \cdot (r_o^4 - r_i^4)}{\rho_L \cdot \omega^2 \cdot Q_L^2}\right]^{1/3}. \quad (7)$$

For the adopted disc the inner radius was 0.10 m and the outer radius was 0.25 m. Thus, for a supersaturation value of 1272, at a rotational speed of 900 rpm (with a residence time of approximately 2.31 s), the specific dispersed power is 115 W/kg, and the mixing time is shorter than 0.9 ms, which is significantly shorter than the induction time computed with Equation 2, i.e. 2.56 ms.

The knowledge of the specific dispersed power allows the determination of the Kolmogoroff turbulent microscale $\lambda_k$, expressed as:

$$\lambda_k = \sqrt[4]{\frac{(\nu_L / \rho_L)}{\varepsilon}} \quad (8)$$

This microscale is a measure of the turbulent eddy size. The effectiveness of micromixing is inversely proportional to the Kolmogoroff microscale. For the spinning disc operating at 900 rpm a value of $\lambda_k \cong 10$ μm can be estimated. It is necessary to observe that $\lambda_k$ should be evaluated from the local and not from the average energy dissipation. However, on the basis of the above calculations and the obtained results, it is possible to conclude that for the precipitation of barium sulphate occurring over the spinning disc, a Kolmogoroff turbulent microscale equal to or lower than 10 μm leads to homogeneous supersaturation.

The calculated values of $t_m$ and $t_{ind}$ confirm the experimental results. In fact, by increasing the rotational speed of the spinning disc, it is possible to attain a micromixing time in the liquid film on the surface of the disc shorter than the induction time and operating conditions such that homogenous nucleation is attained. A further validation of the nucleation results was made on the basis of the comparison of the theoretical (ideal) nucleation rate, computed following Söhnel et al. (1992), with the experimental nucleation rate, computed on the basis of the number of precipitated particles and the mixing time. The theoretical nucleation rate was found to be equal to $2.48 \times 10^3$ cm$^{-3}$ s$^{-1}$ (see Appendix). The experimental nucleation rate was computed on the basis of the number of precipitated particles per cubic centimeter ($3.2 \times 10^9$) and the mixing time (0.9 ms), and it was found approximately to be $3.55 \times 10^{12}$ cm$^3$ s$^{-1}$, which is fairly consistent with the theoretical nucleation rate.

Finally, a comparison was carried out on the specific dispersed power used in the spinning disc reactors and in the traditional T-mixers and Y-mixers. These devices provide a direct mixing of the feed streams together in a very small volume, which enhances the mixing conditions and ensures very low micromixing times (less than 10 ms). Furthermore, because of the small volume in which the reactants mix, very high levels of supersaturation are reached in a well-defined and relatively small area of the reactor, making the precipitation process easier to control. In fact, as observed by Bénet at al. (Bénet, N., Flak, L., Muhr, H., Plasari, E., 1999. Experimental Study of a Two-Impinging-Jet Mixing Device for Application in Precipitation Processes. *Industrial Christallization*. IchemE.), in continuous flow mixers, the level of supersaturation at which the nucleation process takes place is much more related to the initial reactants concentration than it is in stirred tank reactors. The geometry of these devices and the flow conditions prevent the occurrence of backmixing and recirculation phenomena. In addition, a sudden drop of the supersaturation level in the outlet conduct reduces secondary nucleation and crystal growth phenomena (Kind, M., 1999. Precipitation Phenomena and their Relevance to Precipitation Technology. *Industrial Christallization*. IchemE.). Therefore, the main advantage deriving from using such devices is that the precipitation of primary particles can be controlled by the initial supersaturation.

However, it is noticed that, because of their design, continuous flow mixers exhibit intense pressure drop in the mixing chamber. Consequently, such devices to operate require a very high specific power input, which is generally of the order of 100 kW/kg. In particular, the results attained on the spinning disc were compared with those published by Mohanty et al. (Mohanty, R. Bhandarkar, S. Zuromski, B., Brown, R., Estrin, J., 1988, Characterising the Product Crystals from a Mixing Tee Process, *AIChE Journal*, 34 (12), 2063–2068.) for a T-mixer with an arm of 9 mm, at $N_{Re}=24000$, and a measured pressure drop of 310 kPa. The specific dispersed power for this configuration of the T-mixer was evaluated on the basis of the pressure friction drop in the mix chamber of the T geometry, which was estimated to be equal to 80 kPa (Glück, B., 1988, Hydrodynamische und gasdynamische Rohrströmung: Druckverluste, VEB Verlag für Bauwesen, Berlin.). Then, by using the expression reported by Mohanty et al. (1988):

$$\varepsilon = \frac{\Delta p \cdot Q_L}{\rho_L \cdot \frac{\pi \cdot d^2}{4} \cdot L} \quad (9)$$

the specific dispersed power was found approximately equal to 112 kW/kg. This value was found to be in accordance with the references found in the literature (Bénet et al., 1999; Heyer et al. 1999). For the same T-mixer geometry, the micromixing time was calculated using the relationship proposed by Geisler (Geisler, R., Mersmann, A., Voit, H., 1988, Makro- und Mikmomische im Rührkessel, *Chem. Ing. Tech.*, 60, 947.):

$$t_m = 50 \cdot \left(\frac{\nu_L}{\varepsilon}\right)^{1/2} \cdot (0.88 + \ln(Sc)) \quad (10)$$

and was found to be approximately equal to 1.05 ms, which is in accordance with the mixing time estimated by Mohanty et al. (1988), and this result confirms the value of the specific dispersed power found with Equation 5.

In Table 2 spinning disc reactors and T-mixers are compared in terms of number of crystals per cubic centimeter, dispersed specific power and mixing time. From this table it is evident that spinning disc reactor can provide an intense mixing at a significantly lower power dispersion than the T-mixer. In particular, although the number of crystals per cubic centimeter precipitated by means of the two techniques is similar, the specific dispersed power for the spinning disc reactor is significantly lower than the specific dispersed power for rapid T-mixer. Consequently, it can be argued that spinning disc reactors represent valid candidates for industrial application of homogeneous nucleation processes. Furthermore, the scale-up to an industrial scale of such devices is not as problematic as the scale-up of rapid T-mixers and Y-mixers. This is mainly due to the fact that spinning disc reactors do not appear to be prone to incrustation problems and do not exhibit the extreme pressure drops that are typical of tubular T-mixers and Y-mixers. As a consequence, it is feasible to operate such reactors in continuous mode with a significantly small power consumption.

It is also important to mention that the high supersaturation level and the intense mixing conditions confined in a very small area enhance agglomeration phenomena between the precipitated particles and incrustation in the conducts of T-mixers and Y-mixers. Furthermore, agglomeration phenomena, apart from degrading the quality of the product, may imply changes in the Theological properties of the suspension (Kind, 1999), which can then increase the pressure drop in the mixing chamber. These problems impose severe limitations to the scale-up of T-mixers and Y-mixers to industrial scale. To overcome this limitation, Bénet et al. (1999) proposed a boundary free continuous flow mixer. This is constituted of a two impinging jets (TIJ) mixer which is immersed in a stirred tank reactor. The authors claim mixing times of up to 2 ms, i.e. comparable to the mixing time of T-mixers and Y-mixers. Nevertheless, the problem of high specific power consumption remains. In addition to the ability of the spinning disc reactor to promote homogenous nucleation with reduced power consumption it offers the following opportunities: coating of particles as they are formed by introducing a third stream on the disc, carrying out precipitation reactions at controlled temperatures due to the good heat transfer characteristics of spinning disc reactors and the potential of rapid heating/cooling for minimising agglomeration. The ease with which the disc surface can be cleaned and the fact that these reactors can be designed to include non-evasive analytical techniques for product characterisation makes this concept of processing attractive.

Homogeneous nucleation of primary particles represents an appealing methodology for the production of nano-size particles. Intense mixing conditions, with micromixing times shorter than the induction time of precipitation reaction are required to enhance homogenous nucleation of primary particles. It is known that stirred tank reactors cannot provide the required intense mixing conditions and uniform level of supersaturation in the reactors. On the other hand, continuous flow mixers, such as T-mixers and Y-mixers, have been shown to provide such conditions. However, this is achieved with a significant power dissipation (of the order of 100 kW/kg). This, in conjunction with severe incrustation problems, makes the scale-up to an industrial scale of such devices unfeasible. Spinning disc (rotating surface) reactors have been found to provide the intense mixing conditions that are required for homogenous nucleation of primary particles. Such reactors have been successfully used as polymerisation reactors and in general for intensified heat transfer processes.

In this example, the use of a spinning disc reactor is proposed in order to accomplish the precipitation of barium sulphate. By operating a smooth disc (0.5 m in diameter) at a rotational speed of 900–1000 rpm, experimental results were obtained in a good agreement with those found in the literature, concerning the use of a rapid T-mixer. In particular, with a specific dispersed power of about 100 W/kg, it was possible to accomplish an intense homogeneous nucleation, with a very high specific number of crystals in the size range 0.5 to 1 µm. Comparison of the induction and mixing time and of the theoretical and experimental nucleation rate confirmed the occurrence of homogeneous nucleation. From these results, spinning disc (rotating surface) reactors appear to be valuable equipment for carrying out the first stage of a reaction-precipitation process.

Figure 3:
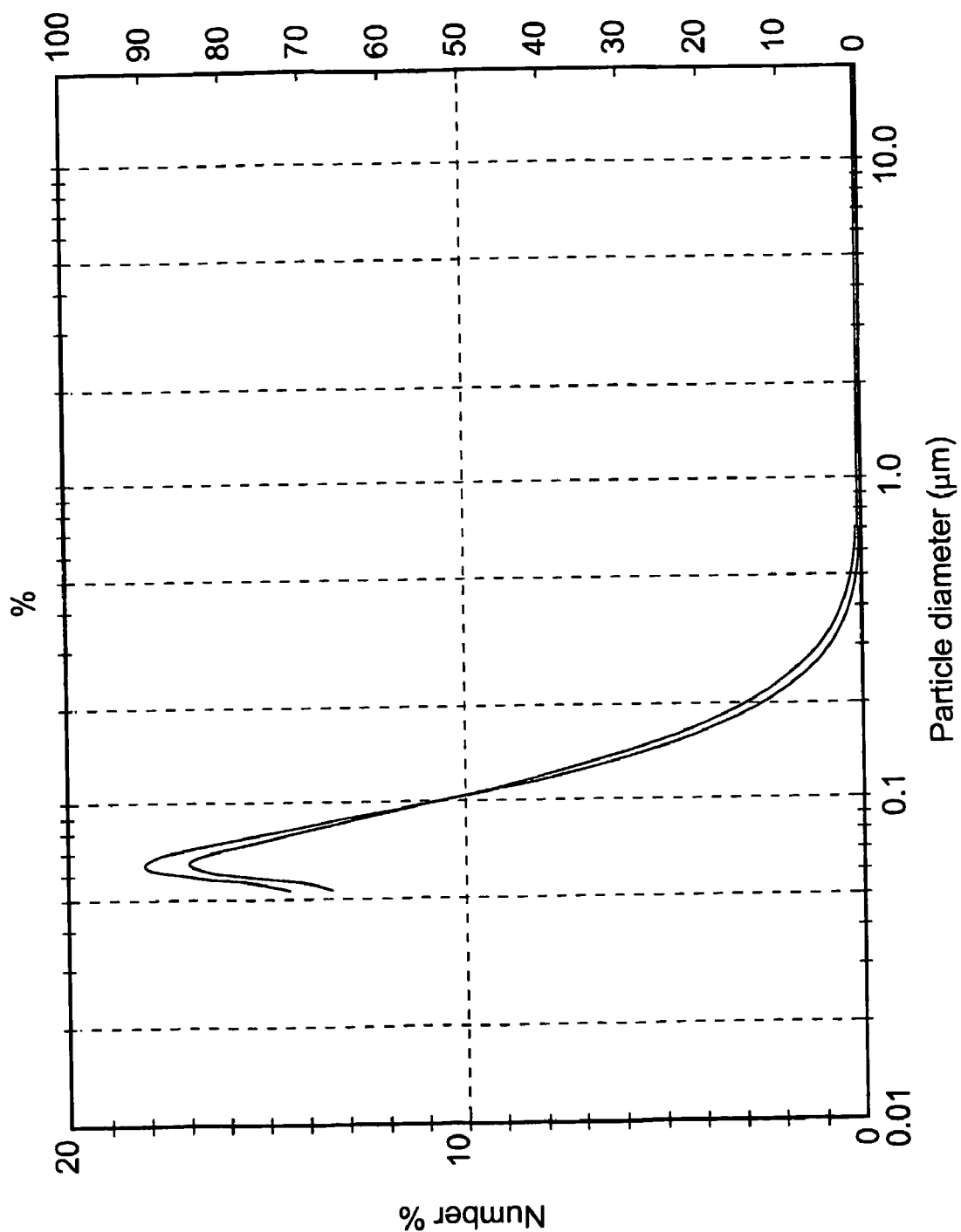
FIG. 3 is a plot of particle number % age versus particle diameter for barium sulphate nanoparticles produced by a rotating conical surface reactor.

FIG. 3 shows a plot of particle number % age against particle diameter in µm for barium sulphate crystals produced on a spinning cone reactor at an initial supersaturation $S_0$=3000 and at a rotational speed of 8000 rpm. It can be seen that the peak of the particle size distribution occurs at 0.07 µm (70 nm), with the maximum particle diameter being around 0.7 µm (700 nm).

Figure 4:
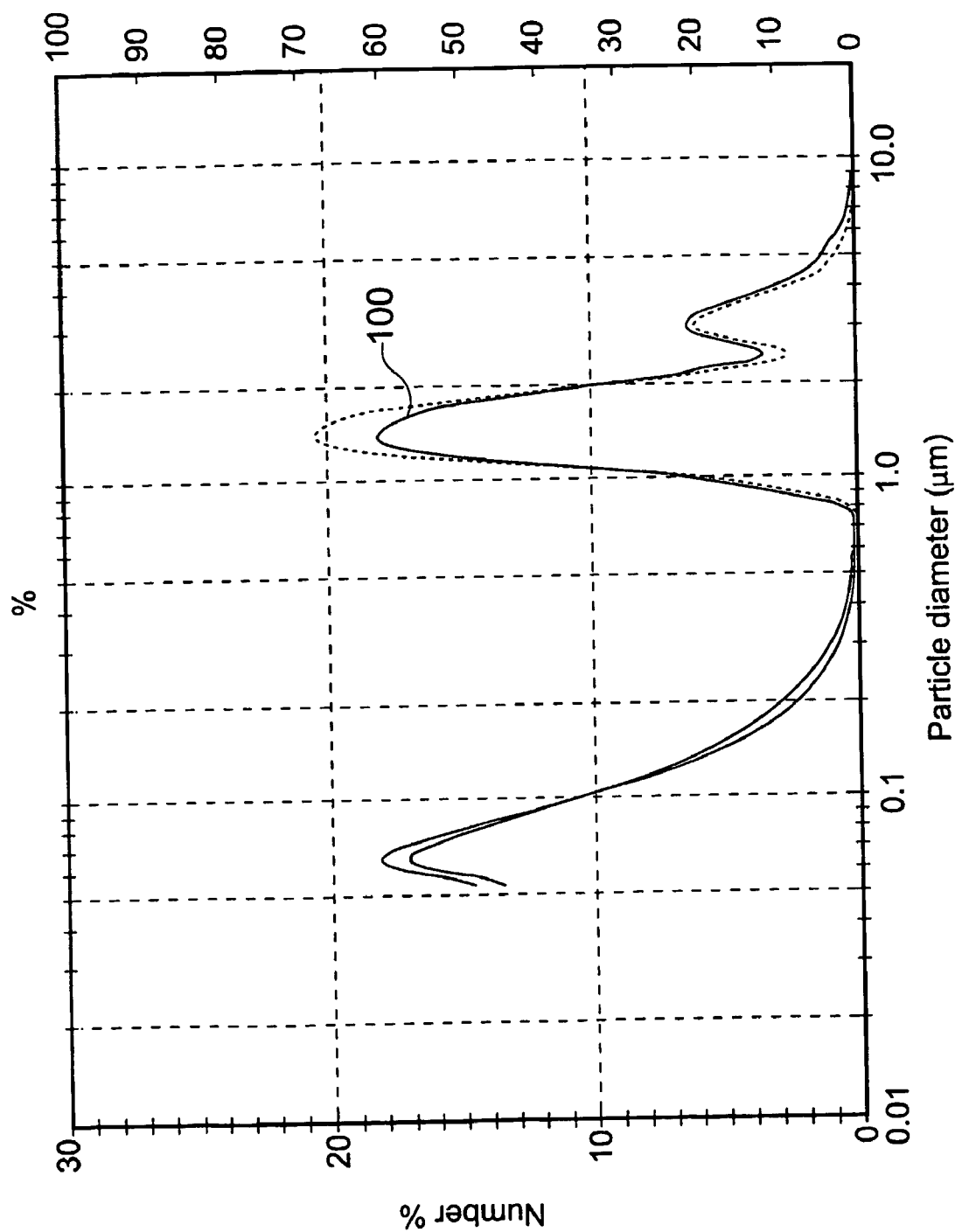
FIG. 4 is a plot of particle number % age versus particle diameter for barium sulphate nanoparticles produced by a rotating conical surface reactor compared with particles produced in a stirred tank reactor.

FIG. 4 shows the plot of FIG. 3 compared with a plot marked 100 of particle number % age against particle diameter in µm for barium sulphate crystals produced in a traditional stirred tank reactor. It can be seen that the particle distribution plot 100 for the stirred tank reactor has two peaks, one at 1.5 µm and one at around 3 µm. The efficacy of embodiments of the present invention (as compared to a batch reactor) in producing nanoparticles with a tight size distribution is thus demonstrated.

Figure 5:
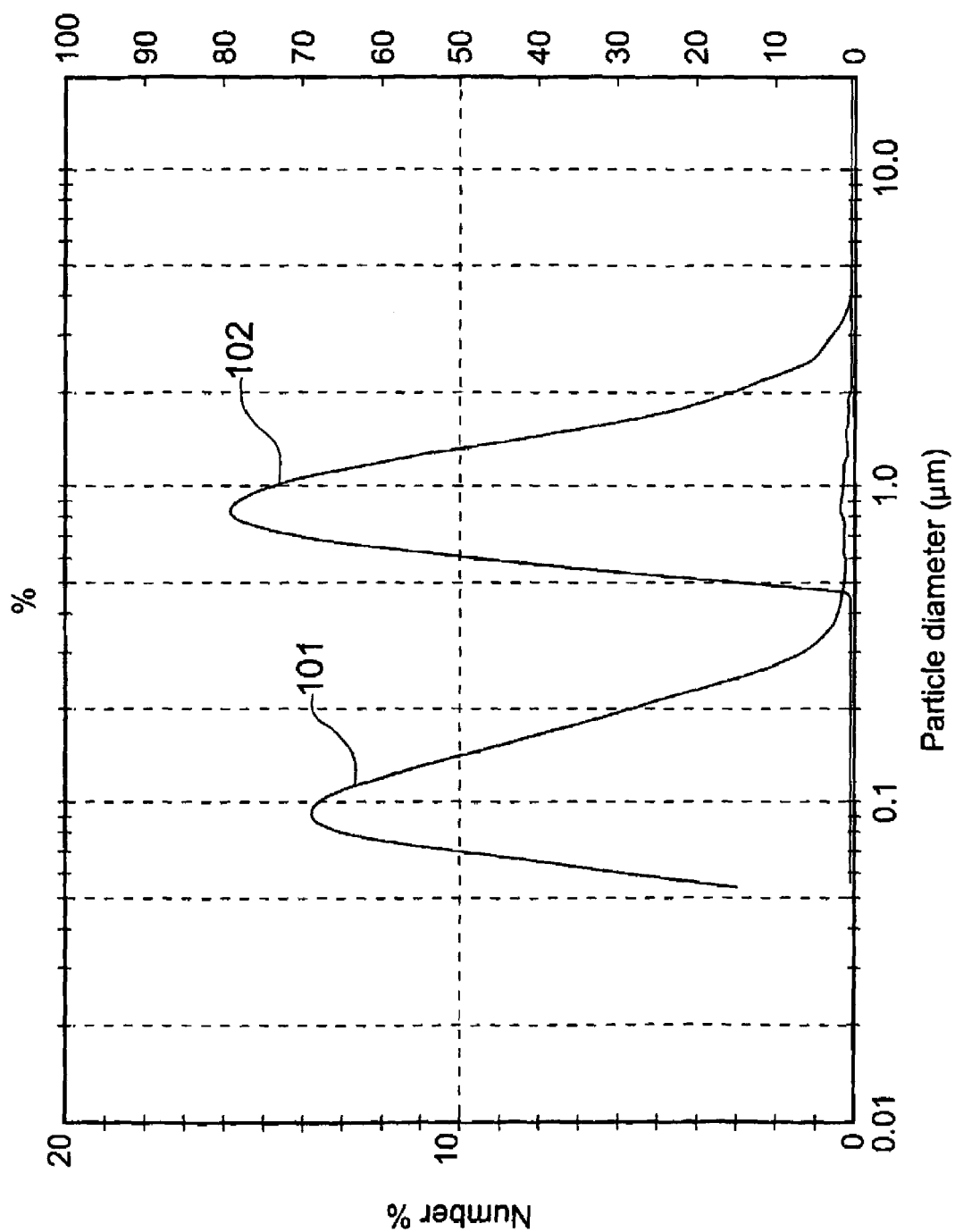
FIG. 5 is a plot of particle number % age versus particle diameter for barium sulphate nanoparticles produced by a rotating conical surface reactor in the presence of 0.2% wt agar compared with particles produced without the presence of agar.

FIG. 5 shows a plot of particle number % age against particle diameter in µm for barium sulphate crystals produced on a spinning cone reactor at an initial supersaturation $S_0$=3000, a rotational speed of 2000 rpm and a solution flow rate of 20 ml/s. The left hand plot, marked 101, shows the size distribution for barium sulphate crystals produced with the addition to the spinning cone of a 0.2% wt agar solution. The right hand plot, marked 102, shows the size distribution for barium sulphate crystals produced without the addition of agar solution. It can be seen that the presence of the agar solution results in a distribution having a peak at 0.1 µm, whereas the distribution without agar solution has a peak at 0.8 µm. It is believed that the agar solution helps to coat precipitated barium sulphate nanoparticles and to prevent the crystallised nanoparticles from growing in size, as well as helping to reduce agglomeration.

Figure 6:
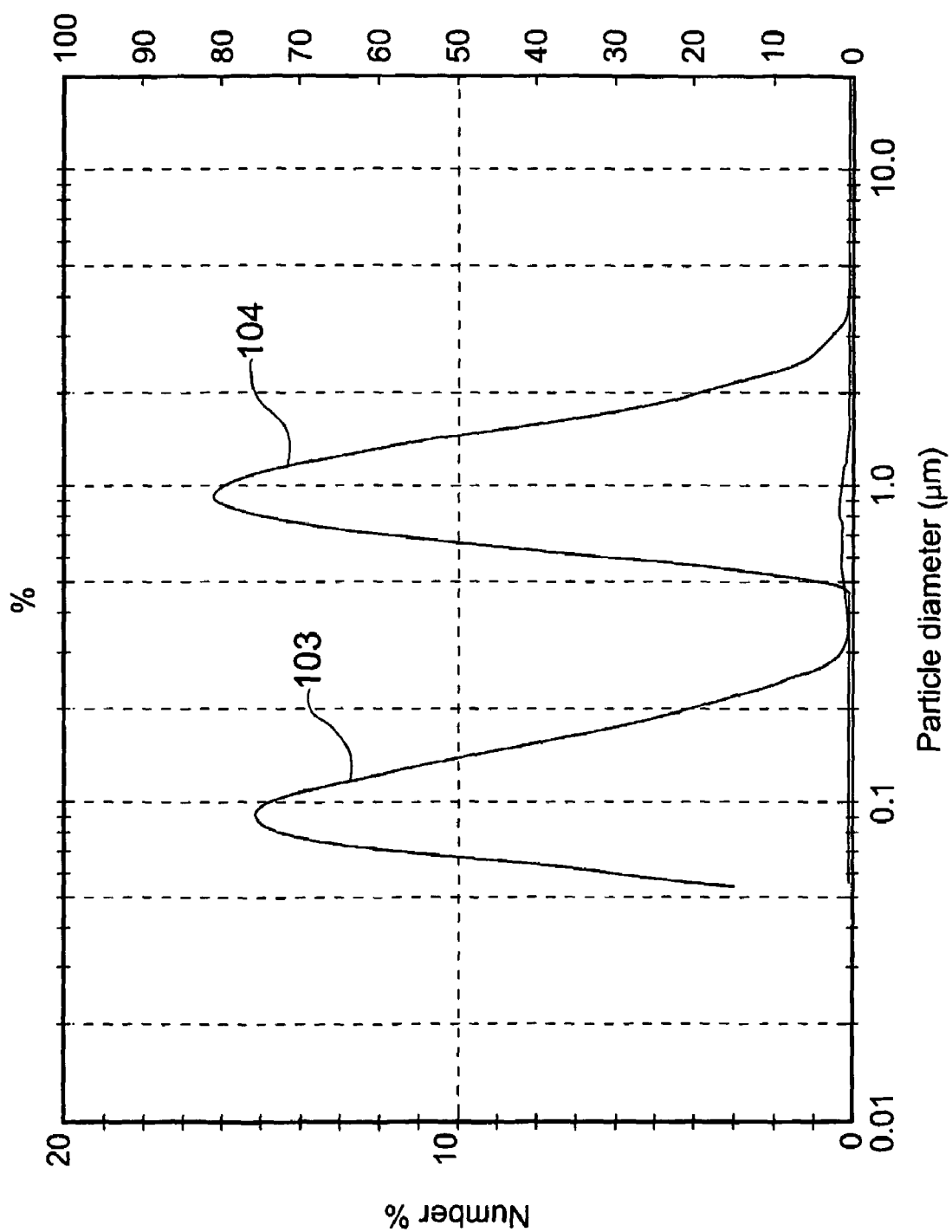
FIG. 6 is a plot of particle number % age versus particle diameter for barium sulphate nanoparticles produced by a rotating conical surface reactor with the application of additional ultrasound compared with particles produced without the addition of ultrasound.

FIG. 6 shows a plot of particle number % age against particle diameter in µm for barium sulphate crystals produced on a spinning cone reactor at an initial supersaturation $S_0$=3000, a rotational speed of 2000 rpm and a solution flow rate of 30 ml/s. The left hand plot, marked 103, shows the size distribution for barium sulphate crystals produced with the application of ultrasound energy to the spinning cone. The right hand plot, marked 104, shows the size distribution for barium sulphate crystals produced without the application of ultrasound energy. It can be seen that the application of ultrasound energy results in a distribution having a peak at 0.09 µm, whereas the distribution without the application of ultrasound energy has a peak at 0.9 µm. It is believed that the application of ultrasound energy helps to reduce agglomeration the crystallised nanoparticles.

Figure 7:
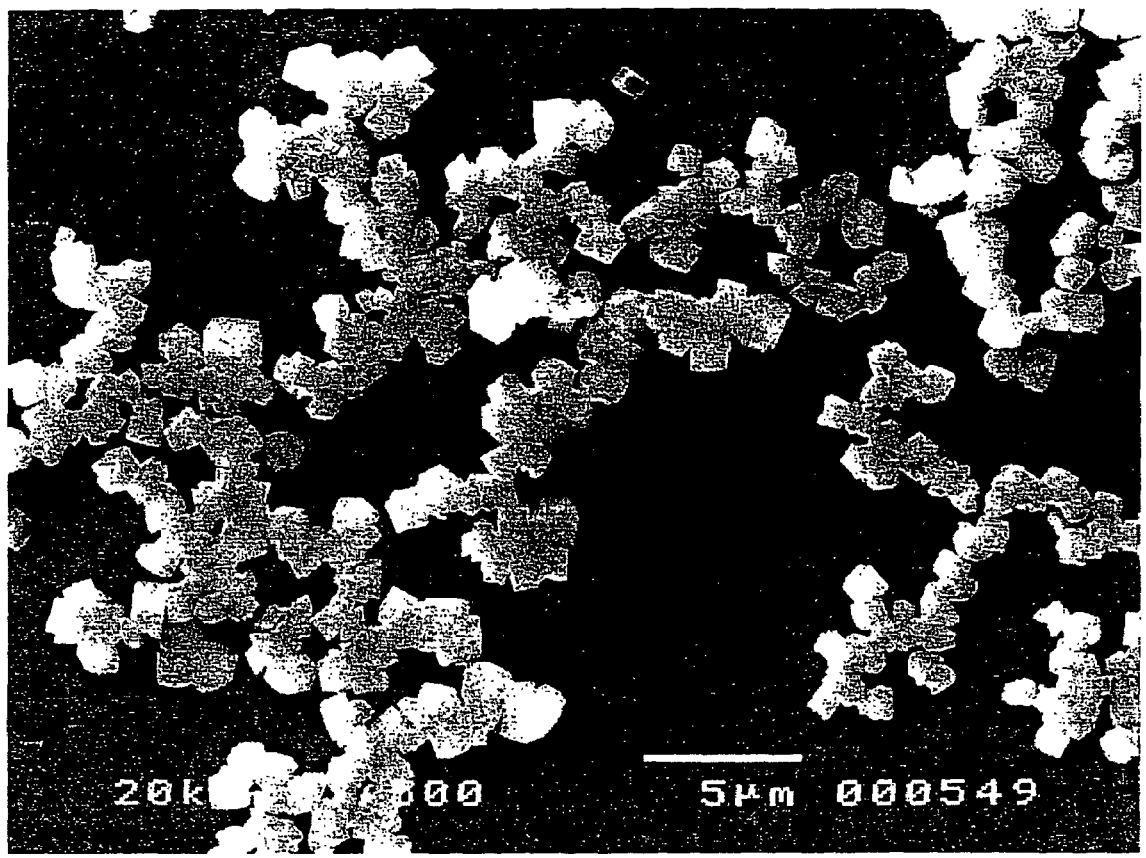
FIG. 7 is a scanning electron micrograph of cubic calcium carbonate crystals formed by way of an embodiment of the present invention.
Figure 8:
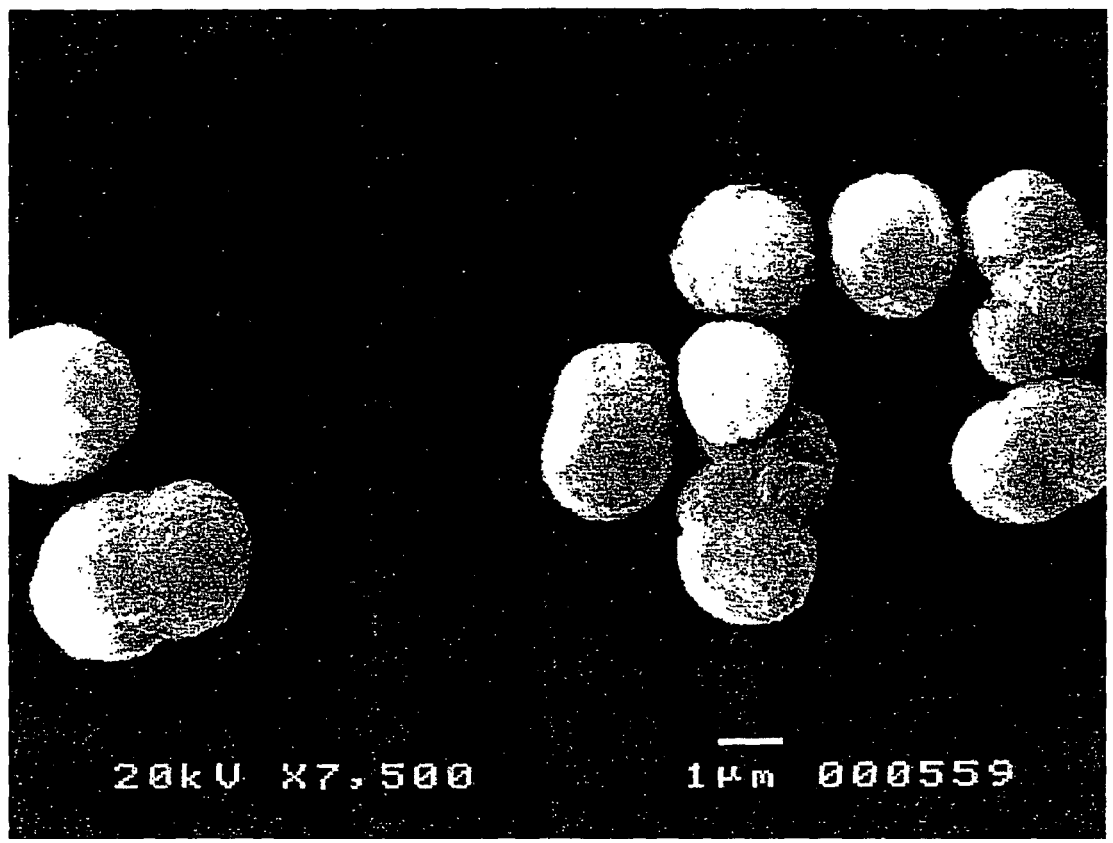
FIG. 8 is a scanning electron micrograph of spherical calcium carbonate crystals formed by way of an embodiment of the present invention.

FIGS. 7 and 8 are scanning electron micrographs of calcium carbonate crystals produced by way of gas-liquid reaction between calcium hydroxide solution and carbon dioxide gas on a rotating surface reactor. The crystals of FIG. 7 were produced in accordance with the third aspect of the present invention at a rotational speed of approximately 1100 rpm, an inlet pH of 12.45, and outlet pH of 8.4, a carbon dioxide flowrate of 480 cm³/minute and a calcium hydroxide flowrate of 8 ml/s. It can be seen that the crystals produced under these conditions are generally cubic in shape/morphology and generally have a maximum dimension of less than 1 μm. The crystals of FIG. 8 were produced in accordance with the third aspect of the present invention at a rotational speed of approximately 1650 rpm, an inlet pH of 12.45, and outlet pH of 9.0, a carbon dioxide flowrate of 480 cm³/minute and a calcium hydroxide flowrate of 8 ml/s. It can be seen that the crystals produced under these conditions are generally spherical in shape/morphology and generally have a maximum dimension of around 2 μm. It is possible to vary the flowrate of each feedstock and the rotational speed of the rotating surface to achieve crystals of different shapes, sizes and morphologies.

Appendix:

The dimensionless driving force for the nucleation process is:

$$\frac{-\Delta\mu_i}{RT} = \ln\frac{a_i}{a_i^*} \tag{11}$$

the superscript "*" refers to the equilibrium or saturation. If the dissolved component is an electrolyte that dissociates in solution to give $v_+$ cations and $v_-$ anions, the activity can be expressed as:

$$a = a_\pm^v = (Q \cdot m \gamma_\pm)^v \tag{12}$$

where m is the concentration expressed in molality, $\gamma_\pm$ the mean ionic activity coefficient and $Q = (v_+^{v_+} v_-^{v_-})^{1/v}$ and $v = v_+ + v_-$. By including the activity expression given by Equation 12 in Equation 11 the crystallisation driving force becomes:

$$-\frac{\Delta\mu}{RT} = \ln\left(\frac{a_\pm}{a_\pm^*}\right)^v = v\ln S_a = v\ln S_0 \xi_c \tag{13}$$

where $S_a = a_\pm/a_\pm^*$, $S_0 = c/c^*$, $\xi_c = \gamma_{\pm,c}/\gamma_{\pm,c}^*$. $S_a$ and $S_0$ represent the definition of supersaturation in terms of activity and concentration, respectively.

The energy barrier to nucleation corresponds to the change of Gibbs energy accompanying formation of the critical nucleus. In the case of homogeneous nucleation this energy change is given by:

$$\Delta G_{hom}^* = \frac{\beta \cdot v^2 \cdot \gamma^{s3}}{\phi^2} \tag{14}$$

where β denotes the geometric factor, which can be written as:

$$\beta = \frac{4k_s^3}{27k_v^2} \tag{15}$$

and for barium sulphate, assuming a cubic crystal, $k_a = 6$ and $k_v = 1$, hence β=32. In Equation 14, v is the molecular volume given by:

$$v = \frac{M}{\rho_s \cdot N_A}; \tag{16}$$

where, for barium sulphate, the molecular mass M is equal to 233.39 g/mole, and the density $\rho_s$ is equal to 4500 kg/m³ ($N_A = 6.023 \times 10^{23}$). Thus the molecular volume is equal to $8.60 \times 10^{-29}$ m³. In Equation 14, $\gamma^s$ is the surface energy, which is equal to 0.136 J/m², and φ denotes the reaction affinity given by:

$$\phi = v \cdot k \cdot T \cdot \ln(S_a) \tag{17}$$

which, from Example 3.1 in Söhnel et al. (1992), with a supersaturation $S_a = 1272$, is equal to $5.87 \times 10^{-20}$ J. The calculation of the supersaturation level in terms of the activity coefficients, $S_a$, was carried out following Söhnel et al.(1992), and using, in particular, the Bromley correlation for multicomponent systems (Expressions 2.60 to 2.64, Söhnel et al., (1992)).

The nucleation rate J can then be expressed as (Expression 3.17, Söhnel et al., (1992)):

$$J = \Omega \cdot \exp\left(-\frac{\Delta G_{hom}^*}{k \cdot T}\right) \tag{18}$$

where the pre-exponential term Ω can be computed as:

$$\Omega = \frac{5.99 \cdot 10^{37}}{N^*} \cdot \left[\frac{4 \cdot \Delta G_{hom}^*}{3 \cdot \pi \cdot k \cdot T}\right]^{1/2}. \tag{19}$$

from Söhnel et al. (1992), Example 3.1, and the number of molecules N* forming the critical nucleus given by:

$$N^* = \frac{\beta \cdot v^2 \cdot \gamma^{s3}}{\phi^3} \tag{20}$$

(Expression 3.16, Söhnel et al., 1992) is equal to 5.87. Thus Ω is equal to $4.28 \times 10^{37}$. Additionally, according to Equation 11, the theoretical nucleation rate J is equal to $2.48 \times 10^3$ cm⁻³ s⁻¹.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

NOTATION a activity;
$a_i$ activity of component i in solution;
c concentration of barium sulphate in solution;
c* equilibrium concentration of barium sulphate in solution;
D diffusion coefficient;
d inner diameter T-mixer arm;
ΔG Gibbs energy change;

i inner side of the disc;
J nucleation rate;
$k_v$ volumetric shape factor;
L length of T-mixer arm;
m molality;
M molecular mass of barium sulphate;
N* Number of molecules forming the critical nucleus;
o outer side of the disc;
p pressure;
Δp pressure drop;
$Q_L$ liquid flowrate;
Q geometric average of ions in solution, $Q=(v_+^{v_+} v_-^{v_-})^{1/v}$;
r radial distance from the centre of the disc;
$S_a$ supersaturation ratio expressed in terms of activity coefficients;
Sc Schmidt number;
$S_0$ supersaturation ratio expressed in terms of concentrations;
$t_m$ mixing time;
$t_{ind}$ induction time;
$t_{res}$ residence time;
u average velocity of the liquid solution on the disc;
v molecular volume;

GREEK SYMBOLS

β shape factor;
$γ_±$ mean ionic activity;
γ activity coefficient;
$γ^s$ surface energy;
ε specific dispersed power;
φ reaction affinity;
$λ_k$ Kolmogoroff turbulent microscale;
$μ_L$ viscosity of the solvent, chemical potential;
Δμ variation of chemical potential;
$v_L$ kinematic viscosity;
$v_+$ cations in solution;
$v_-$ sum of anions in solution;
v ions in solution, $v=v_+ + v_-$;
$ρ_L$ density of the solution;
$ρ_s$ density of the solute;
ω angular velocity of the disc;
Ω pre-exponential term for nucleation rate;

TABLE 1

Number of crystals per cubic centimeter at different levels of supersaturation for spinning disc reactor.

| Supersaturation level | Number of crystals per cubic centimeter |
|---|---|
| 100 | $6.9 × 10^7$ |
| 2000 | $3.2 × 10^9$ |
| 2500 | $4.0 × 10^9$ |

TABLE 2

Comparison of spinning disc reactor and T-mixer. Results for initial supersaturation of 2000.

| | T-mixer (Mohanty) | Spinning Disc 900 rpm |
|---|---|---|
| Number of crystals per cubic centimeter | $2 ÷ 4 × 10^8$ | $4 × 10^9$ |
| Specific dispersed power (W/kg) | $100 × 10^3$ | 115 |
| Mixing time (ms) | 1.05 | 0.9 |

The invention claimed is:

1. A method of manufacturing nanoparticles comprising the steps of:
   I) supplying a solution of at least one predetermined substance to a rotating surface of a rotating surface reactor;
   ii) spreading the solution over the rotating surface as a continuously flowing thin film by rotating the rotating surface of the reactor;
   iii) precipitating or crystallising nanoparticles from the solution within the thin film by way of micromixing and homogeneous nucleation;
   iv) collecting precipitated or crystallised nanoparticles from a periphery of the rotating surface.

2. A method of producing particles of predetermined shape by way of precipitation or crystallisation from solution on a rotating surface of a rotating surface reactor, comprising the steps of:
   I) supplying a solution of at least one predetermined substance to a rotating surface of a rotating surface reactor;
   ii) spreading the solution over the rotating surface as a continuously flowing thin film by rotating the rotating surface of the reactor;
   iii) precipitating or crystallising particles from the solution within the thin film by way of micromixing and homogeneous nucleation;
   iv) collecting precipitated or crystallised particles from a periphery of the rotating surface;
   wherein operating conditions of the rotating surface reactor at step iii) above are selected from one of at least first and second sets of operating conditions, the first set of operating conditions giving rise to particles having a first, predetermined shape and the second set of operating conditions giving rise to particles having a second, predetermined shape different from the first.

3. A method of manufacturing hollow particles by way of precipitation or crystallisation from solution on a rotating surface of a rotating surface reactor, comprising the steps of:
   I) supplying a solution of at least one predetermined substance to a rotating surface of a rotating surface reactor;
   ii) spreading the solution over the rotating surface as a continuously flowing thin film by rotating the rotating surface of the reactor;
   iii) precipitating or crystallising hollow particles from the solution within the thin film by way of micromixing and homogeneous nucleation;
   iv) collecting the hollow particles from a periphery of the rotating surface.

4. A method according to claim 1, wherein the solution is a supersaturated solution.

5. A method according to claim 1, wherein the solution is heated or cooled on the rotating surface so as to become supersaturated.

6. A method according to claim 1, wherein nanoparticles having a mean maximum dimension of less than 1 μm are collected from the periphery of the rotating surface.

7. A method according to claim 1, wherein nanoparticles having a mean maximum dimension of less than 0.9 μm are collected from the periphery of the rotating surface.

8. A method according to claim 1, wherein nanoparticles having a mean maximum dimension of less than 0.8 μm are collected from the periphery of the rotating surface.

9. A method according to claim 1, wherein nanoparticles having a mean maximum dimension of 0.5 μm are collected from the periphery of the rotating surface.

10. A method according to claim 2, wherein particles having a mean maximum dimension of at least 1 μm are collected from the periphery of the rotating surface.

11. A method according to claim 2, wherein particles having a mean maximum dimension of at least 5 μm are collected from the periphery of the rotating surface.

12. A method according to claim 2, wherein particles having a mean maximum dimension of at least 10 μm are collected from the periphery of the rotating surface.

13. A method according to claim 1, wherein the solution is supplied to a central portion of the rotating surface and wherein homogeneous nucleation and precipitation of nanoparticles or particles takes place in the thin film in an annular region surrounding the central portion of the rotating surface.

14. A method according to claim 13, wherein a miscible diluent is supplied to the rotating surface at a region outside the annular region.

15. A method according to claim 1, wherein at least one coating additive is supplied to the rotating surface so as to coat the precipitated nanoparticles or particles.

16. A method according to claim 15, wherein the coating additive is a surfactant, detergent or polymer.

17. A method according to claim 15, wherein the at least one coating additive is supplied to the rotating surface together with the solution.

18. A method according to claim 15, wherein the at least one coating additive is supplied to the rotating surface separately from the solution.

19. A method according to claim 15, wherein the at least one coating additive is supplied to the rotating surface together with a diluent.

20. A method according to claim 1, wherein the precipitation is at least partially a result of inorganic reactive chemistry.

21. A method according to claim 1, wherein the precipitation is at least partially a result of organic drown-out.

22. A method according to claim 1, wherein the precipitation is at least partially a result of metal precipitation.

23. A method according to claim 1, wherein the precipitation is at least partially a result of cooling and heat transfer from the thin film on the rotating surface.

24. A method according to claim 1, wherein the precipitation is at least partially a result of evaporation of at least a part of the thin film on the rotating surface.

25. A method according to claim 1, wherein additional vibrational energy is applied to the thin film on the rotating surface or to product collected from the periphery thereof.

26. A method according to claim 25, wherein the additional vibrational energy is ultrasound.

27. A method according to claim 1, wherein additional electromagnetic radiation is applied to the thin film on the rotating surface or to product collected from the periphery thereof.

* * * * *